(12) United States Patent
Jung et al.

(10) Patent No.: US 12,046,915 B2
(45) Date of Patent: *Jul. 23, 2024

(54) CONTACTLESS POWER RECEPTION DEVICE AND RECEPTION METHOD

(71) Applicant: GE Hybrid Technologies, LLC, Niskayuna, NY (US)

(72) Inventors: Chun-Kil Jung, Seoul (KR); Hak Do Kim, Suwon-si (KR); Sang Youn Noh, Suwon-si (KR)

(73) Assignee: GE Hybrid Technologies, LLC, Niskayuna, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/329,795

(22) Filed: Jun. 6, 2023

(65) Prior Publication Data

US 2023/0318359 A1 Oct. 5, 2023

Related U.S. Application Data

(63) Continuation of application No. 17/322,249, filed on May 17, 2021, now Pat. No. 11,682,923, which is a
(Continued)

(51) Int. Cl.
*H02J 50/12* (2016.01)
*H02J 7/00* (2006.01)
(Continued)

(52) U.S. Cl.
CPC .......... *H02J 50/12* (2016.02); *H02J 7/00034* (2020.01); *H02J 50/40* (2016.02); *H02J 50/80* (2016.02); *H04W 24/08* (2013.01)

(58) Field of Classification Search
CPC .. H02J 50/12; H02J 50/40; H02J 50/80; H02J 7/00034; H04W 24/08
See application file for complete search history.

(56) References Cited

U.S. PATENT DOCUMENTS 10,615,643 B2 4/2020 Jung et al.
10,615,644 B2 4/2020 Jung et al.
(Continued)

FOREIGN PATENT DOCUMENTS

JP 2001127815 5/2001
JP 2010246292 10/2010
(Continued)

OTHER PUBLICATIONS

"Korea patent application No. 10-2023-7014199 Request for the Submission of an Opinion", Nov. 27, 2023, 4 pages.
(Continued)

*Primary Examiner* — Jeffrey M Shin
(74) *Attorney, Agent, or Firm* — DeLizio, Peacock, Lewin & Guerra, LLP (57) ABSTRACT

A wireless power reception device and a wireless communication method thereby are provided. The wireless communication method by the wireless power reception device may comprise the steps of: receiving a wireless power signal from a wireless power transmission device; measuring the strength of the wireless power signal; modulating the amplitude of the wireless power signal according to the measured strength of the wireless power signal; and performing communication with the wireless power transmission device by using the signal having the amplitude modulated.

18 Claims, 10 Drawing Sheets

Related U.S. Application Data continuation of application No. 16/803,475, filed on Feb. 27, 2020, now Pat. No. 11,038,377, which is a continuation of application No. 15/313,972, filed as application No. PCT/KR2015/005252 on May 26, 2015, now Pat. No. 10,615,644.

(60) Provisional application No. 62/002,942, filed on May 26, 2014.

(51) Int. Cl.
  *H02J 50/40* (2016.01)
  *H02J 50/80* (2016.01)
  *H04W 24/08* (2009.01)

(56) References Cited

U.S. PATENT DOCUMENTS

| | | | |
|---|---|---|---|
| 11,038,377 B2 | 6/2021 | Jung et al. | |
| 11,101,698 B2 | 8/2021 | Jung et al. | |
| 11,682,923 B2 * | 6/2023 | Jung | H02J 50/40 307/104 |
| 2010/0007307 A1 | 1/2010 | Baarman et al. | |
| 2010/0270867 A1 | 10/2010 | Abe | |
| 2011/0053500 A1 | 3/2011 | Menegoli et al. | |
| 2011/0309689 A1 | 12/2011 | Kamata | |
| 2012/0112543 A1 | 5/2012 | Van Wageningen et al. | |
| 2012/0155136 A1 | 6/2012 | Von Novak et al. | |
| 2012/0161531 A1 | 6/2012 | Kim | |
| 2013/0069585 A1 | 3/2013 | Kamata et al. | |
| 2013/0154385 A1 | 6/2013 | Miwa et al. | |
| 2014/0008990 A1 | 1/2014 | Yoon | |
| 2014/0028244 A1 | 1/2014 | Korekoda | |
| 2014/0246923 A1 | 9/2014 | Riehl et al. | |
| 2014/0306798 A1 | 10/2014 | Jeon et al. | |
| 2017/0201127 A1 | 7/2017 | Jung et al. | |
| 2017/0201128 A1 | 7/2017 | Jung et al. | |
| 2020/0203999 A1 | 6/2020 | Jung et al. | |
| 2020/0204000 A1 | 6/2020 | Jung et al. | |
| 2021/0273489 A1 | 9/2021 | Jung et al. | |
| 2021/0367454 A1 | 11/2021 | Jung et al. | |

FOREIGN PATENT DOCUMENTS

| | | |
|---|---|---|
| KR | 100971705 | 7/2010 |
| KR | 1020110034664 | 4/2011 |
| KR | 1020120052291 | 5/2012 |
| KR | 101169185 | 7/2012 |
| KR | 1020120073236 | 7/2012 |
| KR | 1020120132375 | 12/2012 |
| KR | 1020130087976 | 8/2013 |
| WO | 2013176751 | 11/2013 |

OTHER PUBLICATIONS

U.S. Appl. No. 16/803,475, Jung et al.
U.S. Appl. No. 16/803,491, Jung et al.
U.S. Appl. No. 17/322,249, Jung et al.
U.S. Appl. No. 17/393,005, Jung et al.
"Korea patent application No. 1020167032594 Notice of Final Rejection", Dec. 26, 2022, 3 pages.
"Korean Application No. 10-2016-7032593 Notification of Reason for Refusal", Sep. 28, 2021, 4 pages.
"Korean Application No. 10-2016-7032594 Notification of Reason for Refusal", Apr. 22, 2022, 5 pages.
"Korean Application No. 10-2016-7032594 Notification of Reason for Refusal", Sep. 28, 2021, 5 pages.
"Korean Application No. 10-2022-7010303 Request for the Submission of an Opinion", Jul. 7, 2022, 4 pages.
"PCT Application No. PCT/KR2015/005249 International Preliminary Report on Patentability", Dec. 8, 2016, 11 pages.
"PCT Application No. PCT/KR2015/005252 International Preliminary Report on Patentability", Dec. 8, 2016, 12 pages.
"PCT Application No. PCT/KR2015/005252 International Search Report", Aug. 17, 2015, 3 pages.
"PCT Application No. PCTKR2015005249 International Search Report", Jul. 29, 2015, 2 pages.
"Qi System Description Wireless Power Transfer", Wireless Power Consortium, vol. 1:Low Power, Part 1:Interface Definition, Version 1.0.1, Oct. 2010, 88 pages.
"U.S. Appl. No. 15/313,970 Final Office Action", Apr. 11, 2019, 6 pages.
"U.S. Appl. No. 15/313,970 Office Action", Jul. 18, 2019, 5 pages.
"U.S. Appl. No. 15/313,970 Office Action", Aug. 1, 2018, 15 pages.
"U.S. Appl. No. 15/313,972 Final Office Action", Jan. 29, 2019, 12 pages.
"U.S. Appl. No. 15/313,972 Final Office Action", Apr. 24, 2019, 6 pages.
"U.S. Appl. No. 15/313,972 Office Action", Jul. 17, 2019, 6 pages.
"U.S. Appl. No. 15/313,972 Office Action", Jul. 31, 2018, 11 pages.
"U.S. Appl. No. 16/803,475 Office Action", Sep. 23, 2020, 9 pages.
"U.S. Appl. No. 16/803,491 Final Office Action", Feb. 8, 2021, 7 pages.
"U.S. Appl. No. 16/803,491 Office Action", Sep. 23, 2020, 10 pages.
"U.S. Appl. No. 17/322,249 Non Final Office Action", Jun. 29, 2022, 8 pages.
"U.S. Appl. No. 17/322,249 Office Action", Feb. 7, 2022, 6 pages.
"U.S. Appl. No. 17/393,005 Final Office Action", Apr. 4, 2023, 6 pages.
"U.S. Appl. No. 17/393,005 Non Final Office Action", Sep. 7, 2022, 10 pages.
"Korea patent application No. 10-2023-7029619 Request for the Submission of an Opinion", Dec. 20, 2023, 6 pages.

* cited by examiner

CONTACTLESS POWER RECEPTION DEVICE AND RECEPTION METHOD

RELATED MATTERS

This application is a continuation of, and claims priority benefit of, U.S. patent application Ser. No. 17/322,249, filed May 17, 2021, which is a continuation of, and claims priority benefit of, U.S. patent application Ser. No. 16/803, 475, filed Feb. 27, 2020, which is a continuation of, and claims priority benefit of, U.S. patent application Ser. No. 15/313,972, filed Nov. 25, 2016, which is the National Stage of PCT International Application No. PCT/KR2015/005252 filed May 26, 2015, which claims the priority benefit of U.S. Provisional Patent Application No. 62/002,942, filed May 26, 2014, the disclosures of each of which are incorporated herein by reference.

BACKGROUND

Technical Field

The present disclosure relates to wireless charging, and more particularly, to a contactless power reception device.

Related Art

In recent years, supply of portable electronic devices including a smart phone, a laptop, an MPEG-1 audio layer (MP3) player, a headset, and the like has been spread. However, since the portable electronic devices operate by consuming power stored in battery cells (e.g., a primary cell, a secondary cell, and the like), the battery cell needs to be charged or replaced in order to continuously operate the portable electronic devices.

A method of charging the battery cell is generally divided into a contact type charging method of charging the battery cell by using a power supply line and a power supply terminal and a contactless charging method of charging the battery cell with wireless power induced by a magnetic field generated from a primary coil of a wireless power transmitting apparatus by using a wireless power reception device. However, in the contact type charging method, an instant discharge phenomenon occurs as different potential differences are generated at both terminals when a charger and a battery are coupled to or separated from each other and the power supply terminal is exposed to the outside, and as a result, fire may occur when foreign materials are accumulated in the power supply terminal and the battery is naturally discharged and the life-span and the performance of the battery deteriorate due to moisture. Accordingly, in recent years, in order to solve the problems, a research into the contactless charging method has been in active progress.

As one of technologies associated with the contactless charging method, "Contactless Charging System" of Korean Patent Registration No. 10-0971705 discloses that a wireless power signal is transmitted by determining measuring a delay time up to a time of receiving a response signal corresponding to a request signal from a time of outputting the request signal through a primary-side core unit and comparing the measured delay time with a reference stand-by time when a load change is sensed in the primary-side core unit of a contactless power transmission device and thereafter, determining that a corresponding object is a foreign material when the measured time is shorter than the reference stand-by time and determining that the corresponding object is a normal contactless power reception device when the measured time is longer than the reference stand-by time.

In the magnetic induction type contactless charging system, the wireless power reception device generally communicates with the wireless power transmission device by an amplitude-shift keying (ASK) modulation method. In detail, when the amplitude of the wireless power signal which the wireless power reception device receives from the wireless power transmission device is modulated, the modulated signal is induced to a transmitting coil of the wireless power transmission device. The wireless power transmission device performs communication by detecting the modulated signal induced to the transmitting coil. However, in the contactless charging system, as the intensity of the wireless power signal transmitted from the wireless power transmitting apparatus increases, distortion occurs in the modulated signal and this causes a communication error between the wireless power transmitting apparatus and the wireless power receiving apparatus.

SUMMARY

The present disclosure provides a wireless power reception device which can smoothly communicate with a wireless power transmission device even when the strength of wireless power transmitted from the wireless power transmission device increases in a contactless charging system.

The present disclosure also provides a wireless communication method which enables a wireless power reception device and a wireless power transmission device to smoothly communicate with each other even when the strength of wireless power transmitted from the wireless power transmission device increases in a contactless charging system.

In an aspect, a wireless communication method by a wireless power reception device is provided. The wireless power reception device includes: receiving a wireless power signal from a wireless power transmission device; measuring the strength of the wireless power signal; modulating the amplitude of the wireless power signal according to the measured strength of the wireless power signal; and performing communication with the wireless power transmission device by using the signal having the amplitude modulated, and the modulating of the amplitude of the wireless power signal may be performed by a modulator included in the wireless power reception device according to the measured strength of the wireless power signal and the modulator may be implemented to include at least one resistor and at least one transistor.

The at least one transistor may be implemented by a metal oxide silicon field effect transistor (MOSFET).

The modulator may be implemented to be configured in a direct current (DC) terminal of the wireless power reception device.

The modulator may be implemented to be configured in an alternating current (AC) terminal of the wireless power reception device.

The modulator may be implemented to include two or more transistors and two or more resistors.

In another aspect of the present disclosure, a wireless power reception device is provided. The wireless power reception device includes: at least one secondary core receiving a wireless power signal transmitted from a wireless power transmission device; a rectifier rectifying the received wireless power signal; a detection circuit measuring the strength of the wireless power signal by monitoring an output of the rectifier a plurality of modulators modulating the amplitude of the wireless power signal; and a controller controlling communication with the wireless power transmission device by using the signal having the amplitude modulated by the modulator, and the modulator may be implemented to include at least one resistor and at least one transistor.

The at least one transistor may be implemented by a metal oxide silicon field effect transistor (MOSFET).

The modulator may be implemented to be configured in a direct current (DC) terminal of the wireless power reception device.

The modulator may be implemented to be configured in an alternating current (AC) terminal of the wireless power reception device.

The modulator may be implemented to include two or more transistors and two or more resistors.

According to the present disclosure, since a wireless power reception device modulates the amplitude of a wireless power signal according to the strength of the wireless power signal transmitted from a wireless power transmission device to prevent a modulated signal from being distorted, smooth wireless communication is available even when strong wireless power signal are transmitted.

DESCRIPTION OF EXEMPLARY EMBODIMENTS

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure. In addition, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements. In addition, terms including "unit", and the like disclosed in the specification mean a unit that processes at least one function or operation and this may be implemented by hardware or software or a combination of hardware and software.

A term called "wireless power" used in the present specification means predetermined type of energy associated with an electric field, a magnetic field, an electromagnetic field, and the like transmitted from a transmitter to a receiver without using physical electromagnetic conductors. The wireless power may be called a power signal or a wireless power signal and mean an oscillating magnetic flux enclosed by a primary coil at a transmitting side and a secondary coil at a receiving side. Hereinafter, a wireless power receiving apparatus and a wireless communication method in a contactless charging system for wirelessly charging devices including a mobile phone, a cordless phone, a smart phone, an MP3 player, a laptop, a headset, and the like will be described as an example. A fundamental principle of wireless power transmission includes both a magnetic induction coupling method and a magnetic resonance coupling (that is, resonance induction) method using frequencies less than 30 MHz. However, various frequencies including frequencies at which a license-exemption operation is permitted at comparative higher radiation levels, for example, less than 135 kHz (low frequency, LF) or 13.56 MHz (high frequency, HF) may be used.

Figure 1:
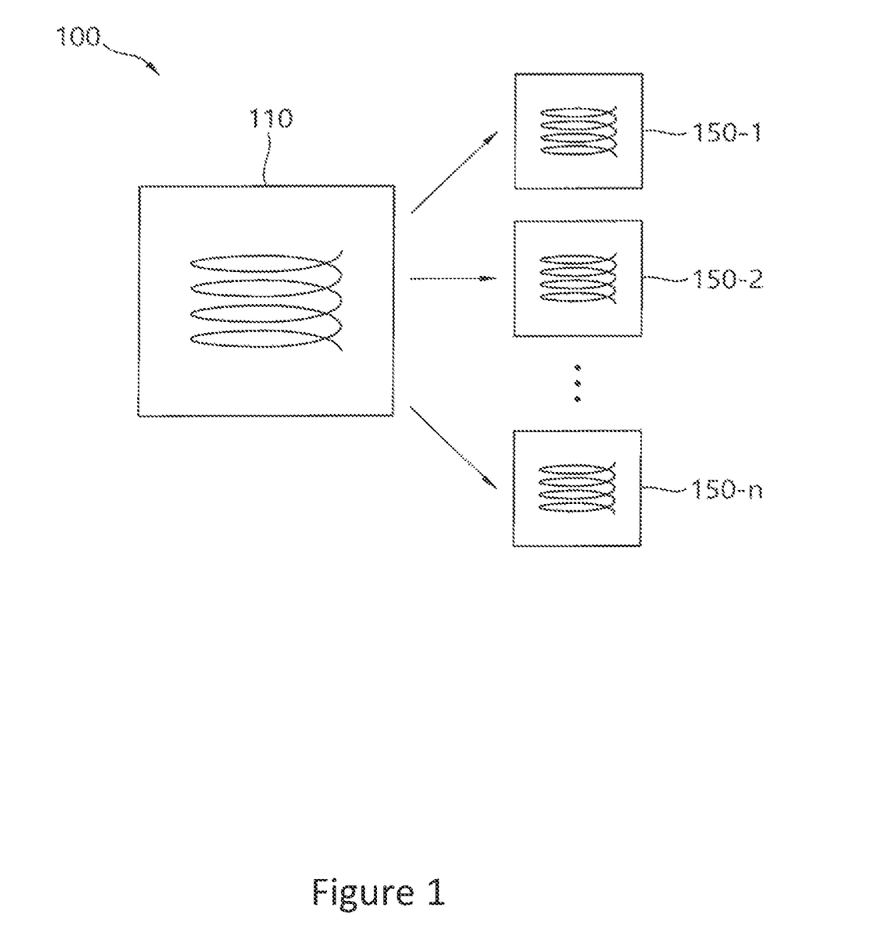
FIG. 1 is a diagram illustrating a contactless charging system according to the present disclosure.

FIG. 1 is a diagram illustrating a contactless charging system according to the present disclosure.

Referring to FIG. 1, the contactless charging system 100 includes a wireless power transmission device 110 and one or more wireless power reception devices 150-1 to 150-n (herein, n is a natural number).

The wireless power transmission device 110 includes a primary core. The primary coil may include at least one primary coil. The wireless power transmission device 110 may have a predetermined appropriate shape, but one preferred embodiment may be a flat platform having a power transmission surface. The respective wireless power reception devices 150-1 to 150-n are positioned on the platform or near the platform to receive wireless power from the wireless power transmission device 110.

The respective wireless power reception devices 150-1 to 150-n may be separated from the wireless power transmission device 110. When the respective wireless power reception devices 150-1 to 150-n are positioned near the wireless power transmission device 110, the respective wireless power reception devices 150-1 to 150-n include the secondary core coupled with an electromagnetic field generated by the primary core of the wireless power transmission device 110. The secondary core may include one or more secondary coils.

The wireless power transmission device 110 transmits power to the wireless power reception devices 150-1 to 150-n without a direct contact. In this case, the primary core and the secondary core are magnetic induction coupled or magnetic resonance coupled to each other. The primary coil or the secondary coil may have predetermined appropriate shapes. As one example, the primary coil and the secondary coil may be copper wires wound around a high magnetic permeability formation such as ferrite or an amorphous material, but are not limited thereto.

The wireless power reception devices 150-1 to 150-n are connected with external load (not illustrated, also referred to as an actual load of the wireless power reception device) to supply the power wirelessly received from the wireless power transmission device 110 to the external load. For example, each of the wireless power reception devices 150-1 to 150-n may transport the received power to an object which consumes or stores the power, such as a portable electric or electronic device or a rechargeable battery cell or battery.

Figure 2:
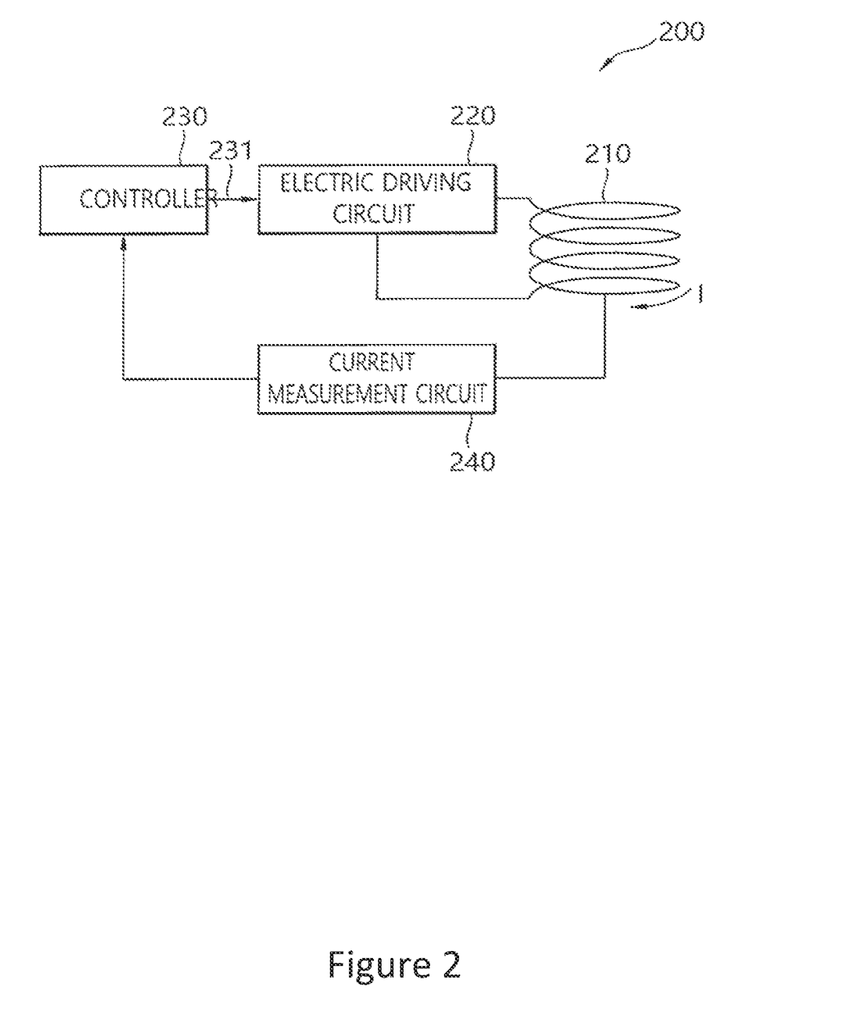
FIG. 2 is a block diagram illustrating a wireless power transmission device included in the contactless charging system.

FIG. 2 is a block diagram illustrating a wireless power transmission device included in the contactless charging system. Hereinafter, the wireless power transmission device will be described in more detail with reference to FIG. 2.

The wireless power transmission device 200 may include a primary core 210, an electric driving circuit 220, a controller 230, and a current measurement circuit 240.

The primary core 210 transmits a signal for detecting the wireless power receiving apparatus and a wireless power signal.

The electric driving circuit 220 is connected to the primary core 210 to apply electric driving signals to the primary core so that the electromagnetic field is generated in the primary core 210.

The controller 230 is connected to the electric driving circuit 220 to generate a control signal 231 to control an alternating current (AC) signal required when the primary core 210 generates an induction magnetic field or causes magnetic resonance. The controller 230 may control an operation frequency, and voltage, current, and/or a duty cycle in the wireless power transmission device 200 according to a power control signal received from the wireless power reception device.

The current measurement circuit 240 measures current that flows on the primary core 220. The current measured by the current measurement circuit 240 may be alternating current (AC). As one example, the current measurement circuit 240 may be a current sensor. Alternatively, the current measurement circuit 240 may be a transformer that lowers high current that flows on the primary core 210 to low current and uses the low current. Further, the current measured by the current measurement circuit 240 may be direct current (DC).

The controller 230 may obtain information transmitted by the wireless power reception device by using a current or voltage value measured by the current measurement circuit 240. The wireless power reception device may continuously or periodically transmit to the wireless power transmission device 200 a power control signal to request an increase of the power or a power control signal to request a decrease of the power until required power is satisfied by varying the load. When the wireless power transmission device 200 receives the power control signal to request the increase of the power from the wireless power reception device through the load variation, the wireless power transmission device 200 decreases the power control signal to an appropriate magnitude by using the transformer or a voltage distributor and performs envelope detection by using a detector and thereafter, makes the power control signal pass through a low-pass filter to detect the signal form the wireless power reception device. In addition, the strength of the current which flows on the primary core 210 may be increased so as to transmit higher power as a response to the power control signal. In more detail, the controller 230 may adjust the control signal so as to apply an AC signal having a larger magnitude than a reference AC signal in order to make higher current flow on the primary core 210. On the contrary, when the controller 230 receives the power control signal to request the decrease of the power from the wireless power reception device, the controller 230 may adjust the control signal so as to apply an AC signal lower than the reference AC signal to the primary core 210 so that power lower than the current transmission power is transmitted.

Figure 3:
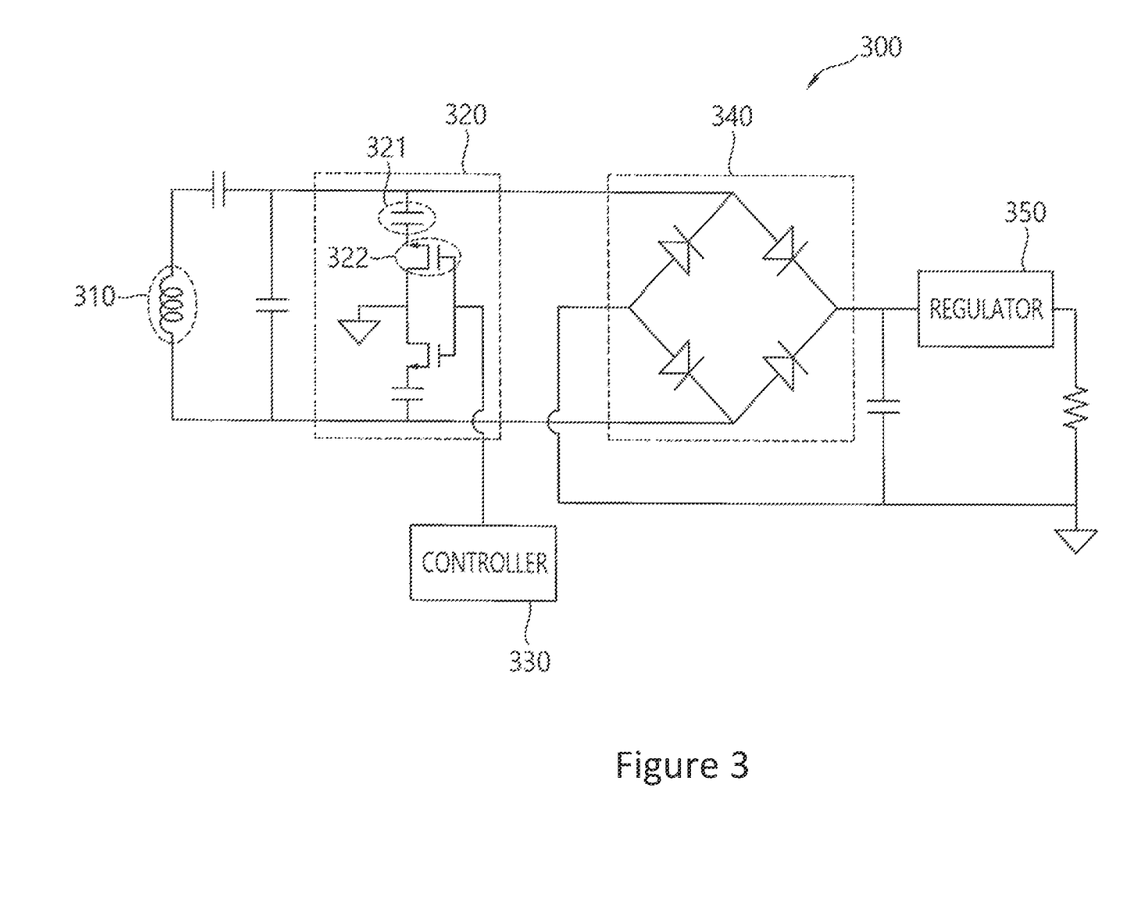
FIG. 3 is a circuit diagram illustrating a wireless power reception device included in the contactless charging system.

FIG. 3 is a circuit diagram illustrating a wireless power reception device included in the contactless charging system. Hereinafter, a structure of the wireless power reception device will be described in more detail with reference to FIG. 3.

The wireless power reception device 300 may include a secondary core 310, a modulator 320, a controller 330, a rectifier 340, and a regulator 350.

The secondary core 310 may be configured by at least one secondary coil. The secondary core 310 may receive a wireless power signal transmitted from the primary core of the wireless power transmission device.

The modulator 320 may be configured by an AC terminal of the wireless power reception device 300 as illustrated in FIG. 3 and modulate the amplitude of the wireless power signal received through the secondary core 310. To this end, the modulator 320 may include a capacitor 321 and a transistor 322. For example, the modulator 320 turns on/off the transistor 322 connected to the capacitor 321 to modulate the amplitude of the wireless power signal received through the secondary core 310. The signal with the modulated amplitude may be induced to the primary core of the wireless power transmission device through the secondary core 310.

The controller 330 which is used for controlling an operation of the wireless power reception device 300 may control power supplied to a load connected to the wireless power reception device 300 as one example. Further, the controller 330 may perform communication with the wireless power transmission device by controlling the modulator 320.

The rectifier 340 may rectify AC power received by the secondary core 310 to direct current (DC) power. The power rectified by the rectifier 340 may be supplied to the load which is connected or mounted onto or included in the wireless power reception device 300. The rectifier 340 may be implemented by a half-bridge, a full-bridge, or the like as illustrated in FIG. 3. In FIG. 3, as an example, it is illustrated that the rectifier 340 includes a plurality of diodes, but the diode of the rectifier 340 may be replaced with the transistor such as a field effect transistor (FET).

The regulator 350 is configured at a rear terminal of a bridge including a plurality of diodes to supply the direct current (DC) power received through the bridge to the load connected or mounted onto or included in the wireless power reception device 300. Herein, the bridge may serve to convert input AC voltage to DC voltage and be implemented by the half-bridge, the full-bridge, or the like.

Meanwhile, although not illustrated in FIG. 3, the wireless power reception device 300 may include a detection circuit which measures strength of the wireless power signal transmitted from the wireless power transmission device by monitoring an output of the rectifier 340.

When the strength of the wireless power signal detected from the detection circuit is larger than or smaller than a predetermined control point, the controller 330 may transmit information on power control so that the wireless power signal with predetermined strength may be received by modulating the amplitude of the wireless power signal received from the wireless power reception device by means of the modulator 320. Alternatively, when the strength of the wireless power signal detected from the detection circuit is beyond the predetermined range, the controller 330 may allow the strength of the wireless power signal to be maintained within the predetermined range by modulating the amplitude of the wireless power signal received from the wireless power reception device by means of the modulator 320. In this case, as illustrated in FIG. 3, when the capacitor 321 is used in the modulator 320, constant impedance for a change in frequency is maintained, and thus even though the frequency is changed, the modulator 320 may perform constant amplitude modulation. However, when a resistor instead of the capacitor 321 is used in the modulator 320, a response time may be minimized according to the used resistor, but since the impedance is changed according to a frequency, when a full band is used, distortion according to the frequency may be caused. Further, even though the capacitor 321 is used in the modulator 320, the magnitude of the power received from the wireless power transmission device is larger than a predetermined value, the signal modulated by the modulator 320 may be distorted. Since the distortion of the modulated signal causes communication failure between the wireless power transmission device and the wireless power reception device 300, the wireless power reception device according to the present disclosure may include components described below for smooth communication.

Figure 4:
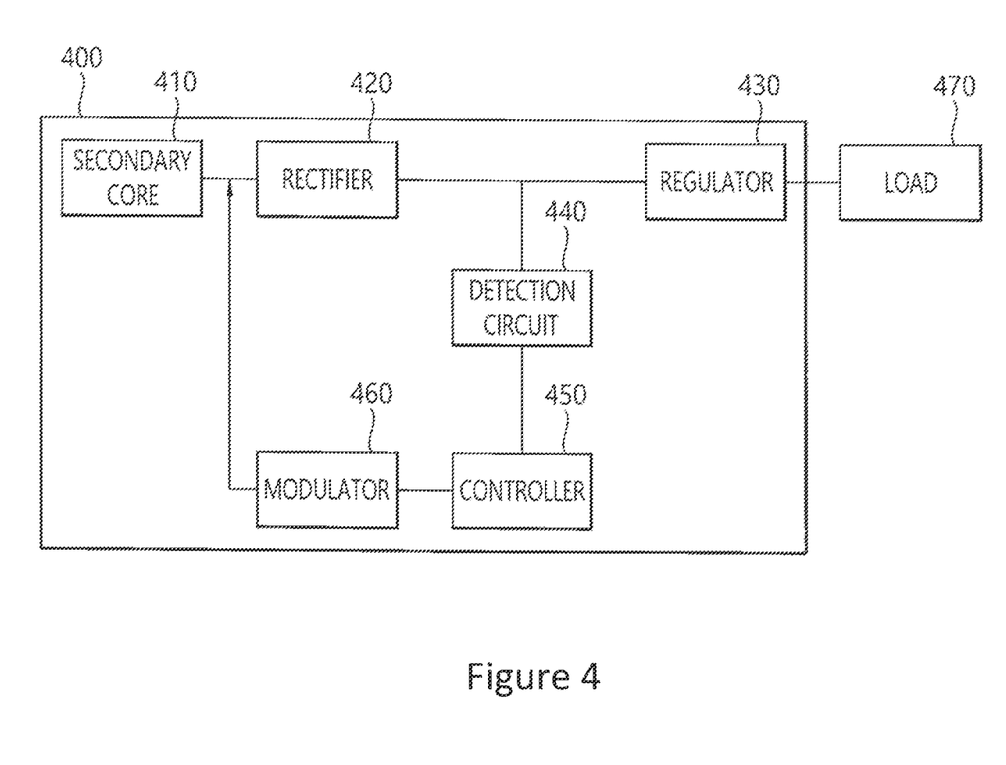
FIG. 4 is a block diagram illustrating a wireless power reception device according to an embodiment of the present disclosure.
Figure 5:
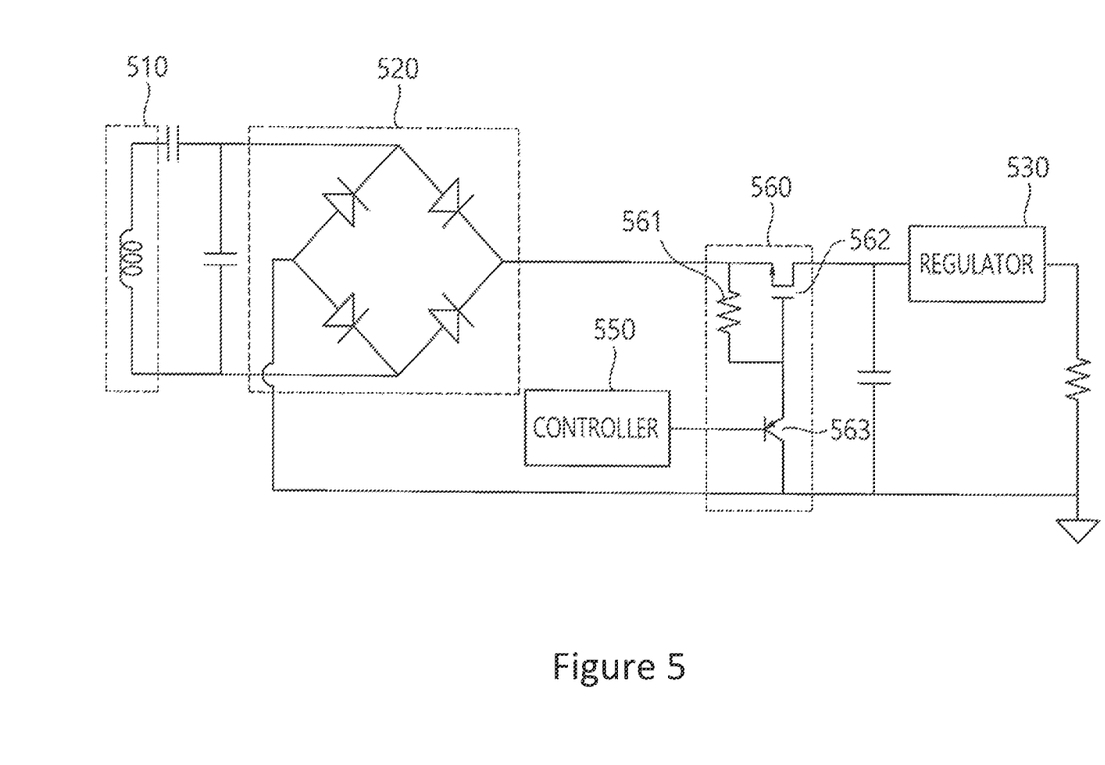
FIG. 5 is a circuit diagram illustrating the wireless power reception device according to the embodiment of the present disclosure.

FIG. 4 is a block diagram illustrating a wireless power reception device according to an embodiment of the present disclosure and FIG. 5 is a circuit diagram illustrating the wireless power reception device according to the embodiment of the present disclosure. Hereinafter, the wireless power reception device according to the embodiment of the present disclosure will be described in detail with reference to FIGS. 4 and 5.

First, referring to FIG. 4, a wireless power reception device 400 according to an embodiment of the present disclosure may include a secondary core 410, a rectifier 420, a regulator 430, a detection circuit 440, a controller 450, and a modulator 460. The wireless power reception device 400 is connected to an external load 470 to supply power wirelessly received from the wireless power transmission device to a load 470.

The secondary core 410 may include at least one secondary coil receiving the wireless power signal transmitted from the wireless power transmission device.

The rectifier 420 may rectify AC power received by the secondary core 410 to direct current (DC) power. The power rectified by the rectifier 420 may be supplied to the load 470 which is connected or mounted onto or included in the wireless power reception device 400. The rectifier 420 may be implemented by a half-bridge, a full-bridge, or the like.

The regulator 430 is configured at a rear terminal of a bridge including a plurality of diodes to supply direct current (DC) power received through the bridge to the load connected or mounted onto or included in the wireless power reception device 300 through the regulator 430. Herein, the bridge may serve to convert input AC voltage to DC voltage and be implemented by the half-bridge, the full-bridge, or the like and the regulator 430 converts the DC voltage of the rectifier into stable DC voltage and supplies the DC voltage to the load.

The detection circuit 440 monitors the DC voltage output from the rectifier 420 in connected with the rear terminal of the rectifier 420 to measure the strength of the wireless power signal transmitted from the wireless power transmission device.

The controller 450 may control communication with the wireless power transmission device by using a signal with the amplitude modulated by the modulator 460 based on the strength of the wireless power signal measured by the detection circuit 440.

The modulator 460 may modulate the amplitude of the wireless power signal transmitted from the wireless power transmission device.

Hereinafter, the wireless power reception device of FIG. 4 will be described in more detail with reference to the circuit diagram of FIG. 5. In FIG. 5, as an example, a case where a secondary core 510 includes one secondary coil is illustrated. Referring to FIG. 5, a modulator 560 is positioned between a rectifier 520 and using the plurality of diodes or FETs and a regulator 530 to modulate the DC power which is the output of the rectifier 520. Further, the modulator 560 may include one resistor 561 and one or more transistors 562 and 563. Since the modulator 560 includes the resistor 561, the response time may be minimized according to the used resistor. However, since the impedance varies depending on the frequency, when the full band is used, the distortion depending on the frequency may be caused, but since the modulator 560 is connected to the DC terminal of the diode bridge in series as illustrated in FIG. 5, the modulator varies the current amount in the direction in which the signal flows to prevent the frequency from being distorted even with the high power. Further, the modulator 560 may include a PNP transistor 563 and a controller 550 is connected to a base terminal of the PNP transistor 563 to switch the modulator 560 and analoguely control the magnitude of amplitude modulation according to a load change amount through the current control. Meanwhile, in FIG. 5, it is illustrated that the rectifier 520 includes a plurality of diodes, but the diode of the rectifier 520 may be replaced with the transistor such as a field effect transistor (FET).

Figure 6:
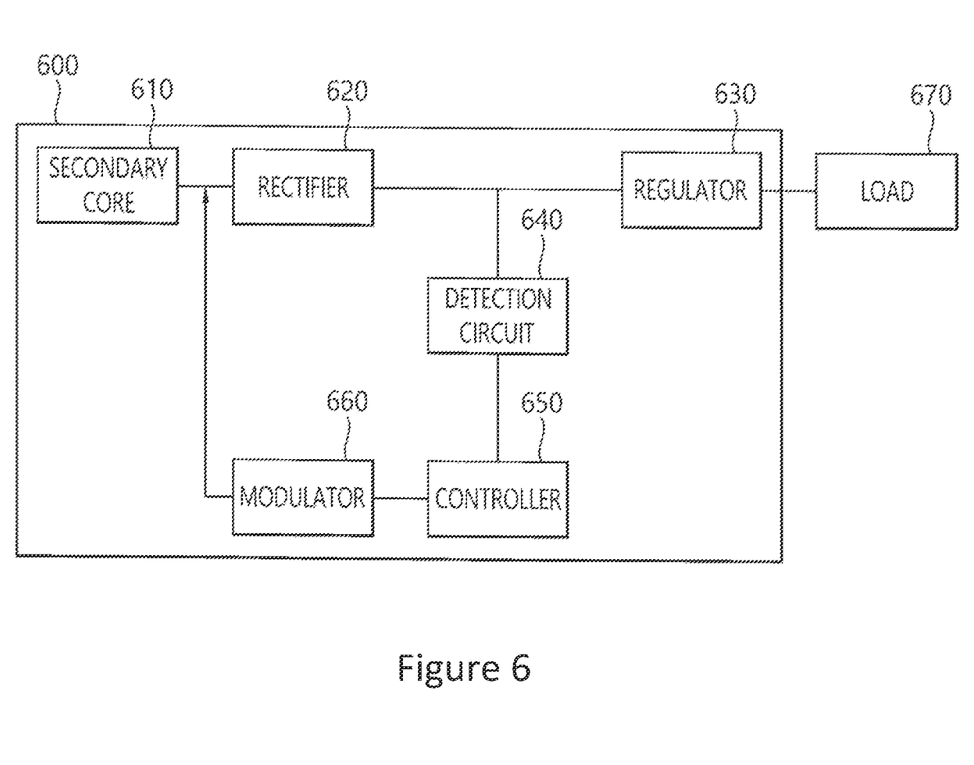
FIG. 6 is a block diagram illustrating a wireless power reception device according to another embodiment of the present disclosure.
Figure 7:
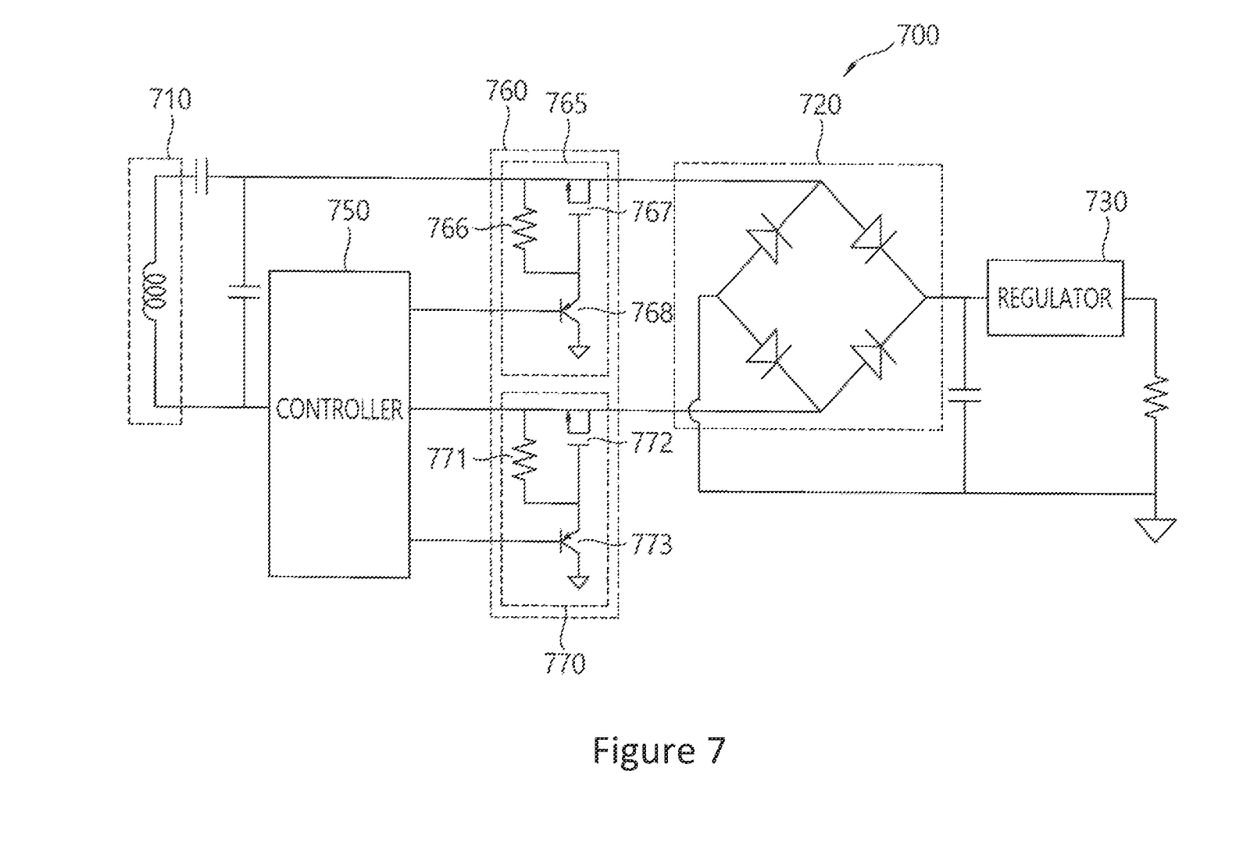
FIG. 7 is a circuit diagram illustrating the wireless power reception device according to the embodiment of FIG. 6.

Meanwhile, FIG. 6 is a block diagram illustrating a wireless power reception device according to another embodiment of the present disclosure and FIG. 7 is a circuit diagram illustrating the wireless power reception device according to the embodiment of FIG. 6. Hereinafter, the wireless power reception device according to the embodiment will be described in detail with reference to FIGS. 6 and 7.

First, referring to FIG. 6, the wireless power reception device 600 according to the embodiment of the present disclosure may include a secondary core 610, a rectifier 620, a regulator 630, a detection circuit 640, a controller 650, and a modulator 660. The wireless power reception device 600 is connected to an external load 670 to supply power wirelessly received from the wireless power transmission device to the load 670.

The secondary core 610 may include at least one secondary coil receiving the wireless power signal transmitted from the wireless power transmission device.

The rectifier 620 may rectify AC power received by the secondary core 610 to direct current (DC) power. The power rectified by the rectifier 620 may be supplied to the load 670 which is connected or mounted onto or included in the wireless power reception device 600. The rectifier 620 may be implemented by a half-bridge, a full-bridge, or the like.

The regulator 630 is configured at a rear terminal of a bridge including a plurality of diodes to supply the direct current (DC) received through the bridge to the load connected or mounted onto or included in the wireless power reception device 600. Herein, the bridge may serve to convert input AC voltage to DC voltage and be implemented by the half-bridge, the full-bridge, or the like.

The detection circuit 640 monitors the DC voltage in connected with the rear terminal of the rectifier 620 to measure the strength of the wireless power signal transmitted from the wireless power transmission device.

The controller 650 may control communication with the wireless power transmission device by using a signal with the amplitude modulated by the modulator 660 based on the strength of the wireless power signal measured by the detection circuit 640.

The modulator 660 may modulate the amplitude of the wireless power signal transmitted from the wireless power transmission device.

Hereinafter, the wireless power reception device of FIG. 6 will be described in more detail with reference to the circuit diagram of FIG. 7. A modulator 760 includes first and second modulation modules 765 and 770. The modulator 760 is configured to be positioned between a secondary corer 710 and a rectifier using a plurality of diodes to modulate AC power which is an output of the core 710. In this case, the first and second modulation modules 765 and 770 may include one or more resistors 788 and 771 and one or more transistors 767 and 772, respectively. Since the modulator 760 includes the resistors 766 and 771, a response time may be minimized according to the used resistors 766 and 771. However, since the impedance varies depending on the frequency, when a full band is used, distortion depending on the frequency may be caused, but the response time and frequency modulation may be more actively controlled by using two or more resistors 766 and 771 and two or more transistors 767 and 772. The first and second modulation modules 765 and 770 may modulate the amplitude of the wireless power signal received through the secondary core 710 by turning on/off or analoguely controlling the transistor connected to the resistor. The signal with the modulated amplitude may be induced to the primary core of the wireless power transmission device through the secondary core 710. Further, the first and second modulation modules 765 and 770 may include one or more PNP transistors 768 and 773 and a controller 750 is connected to base terminals of respective PNP transistors 768 and 773 included in the first and second modulation modules 765 and 770 to control a current flow of the modulator 760. Accordingly, the modulator 760 is switched by the controller 750 and the magnitude of the amplitude modulation is analoguely controlled according to a load change amount through a current control to enable stable communication.

Figure 8:
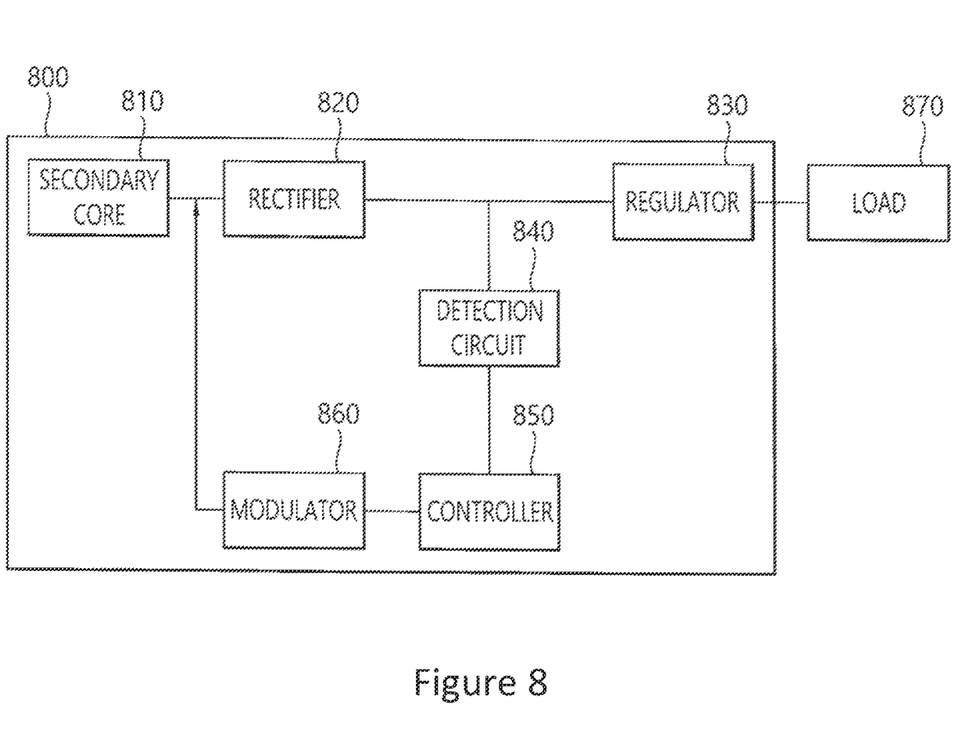
FIG. 8 is a block diagram illustrating a wireless power reception device according to yet another embodiment of the present disclosure.
Figure 9:
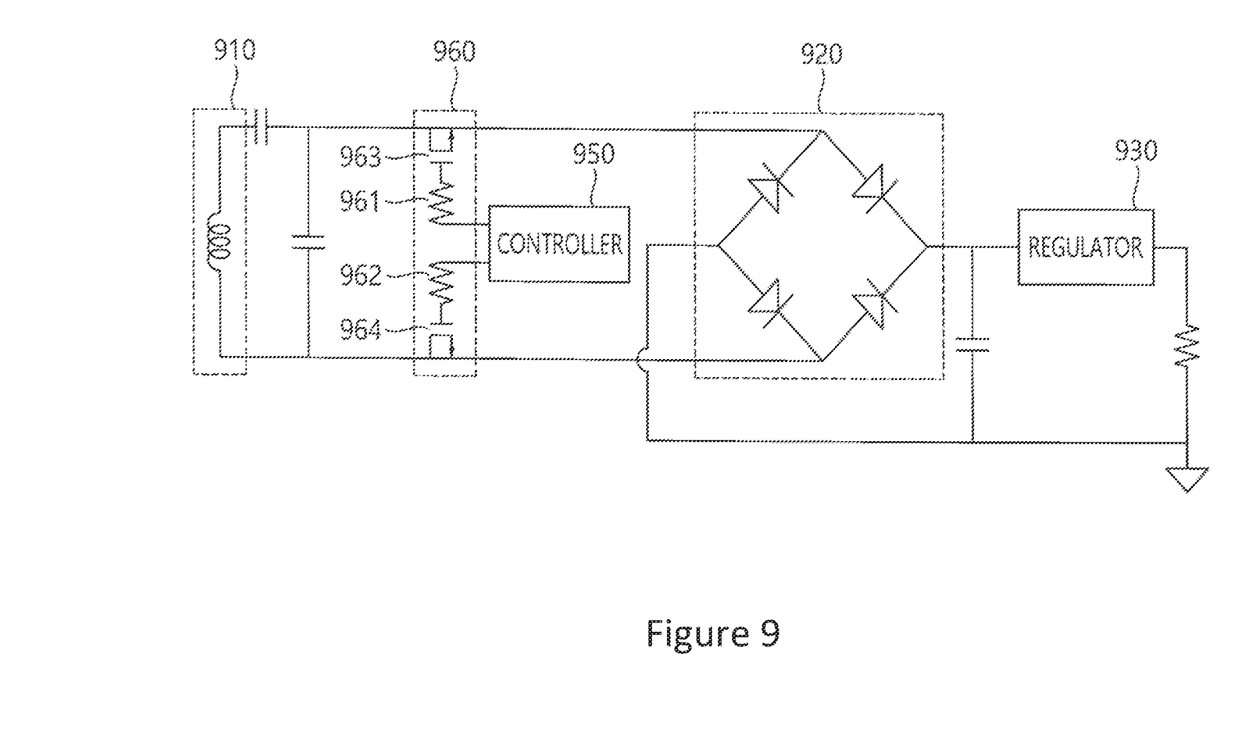
FIG. 9 is a circuit diagram illustrating the wireless power reception device according to the embodiment of FIG. 8.

Meanwhile, FIG. 8 is a block diagram illustrating a wireless power reception device according to yet another embodiment of the present disclosure and FIG. 9 is a circuit diagram illustrating the wireless power reception device according to the embodiment of the present disclosure. Hereinafter, the wireless power reception device according to the embodiment will be described in detail with reference to FIGS. 8 and 9.

First, referring to FIG. 8, the wireless power reception device 800 according to the embodiment of the present disclosure may include a secondary core 810, a rectifier 820, a regulator 830, a detection circuit 840, a controller 850, and a modulator 860. The wireless power reception device 800 is connected to an external load 870 to supply power wirelessly received from the wireless power transmission device to the load 870.

The secondary core 810 may include at least one secondary coil receiving the wireless power signal transmitted from the wireless power transmission device.

The rectifier 820 may rectify AC power received by the secondary core 810 to direct current (DC) power. The power rectified by the rectifier 820 may be supplied to the load 870 which is connected, installed, or included to the wireless power reception device 800 by the regulator 830. The rectifier 820 may be implemented by a half-bridge, a full-bridge, or the like.

The regulator 830 is configured at a rear terminal of a bridge including a plurality of diodes to supply the direct current (DC) power received through the bridge to the load connected or mounted onto or included in the wireless power reception device 800. Herein, the bridge may serve to convert input AC voltage to DC voltage and be implemented by the half-bridge, the full-bridge, or the like.

The detection circuit 840 monitors the DC voltage in connected with the rear terminal of the rectifier 820 to measure the strength of the wireless power signal transmitted from the wireless power transmission device.

The controller 850 may control communication with the wireless power transmission device by using a signal with the amplitude modulated by the modulator 860 based on the strength of the wireless power signal measured by the detection circuit 840.

The modulator 860 may modulate the amplitude of the wireless power signal transmitted from the wireless power transmission device.

Hereinafter, the wireless power reception device of FIG. 9 will be described in more detail with reference to the circuit diagram of FIG. 9. Referring to FIG. 9, a modulator 960 may include two resistors 961 and 962 and two transistors 963 and 964. The two transistors 963 and 964 may be a metal oxide silicon field effect transistor (MOSFET). Further, since the modulator 960 includes the resistors 961 and 962, the response time may be minimized according to the used resistors 961 and 962. Further, the current flow may be more actively controlled by switching on/off two transistors 963 and 964. Further, the modulator 960 configured as illustrated in FIG. 9 may perform modulation through a controller 950.

Figure 10:
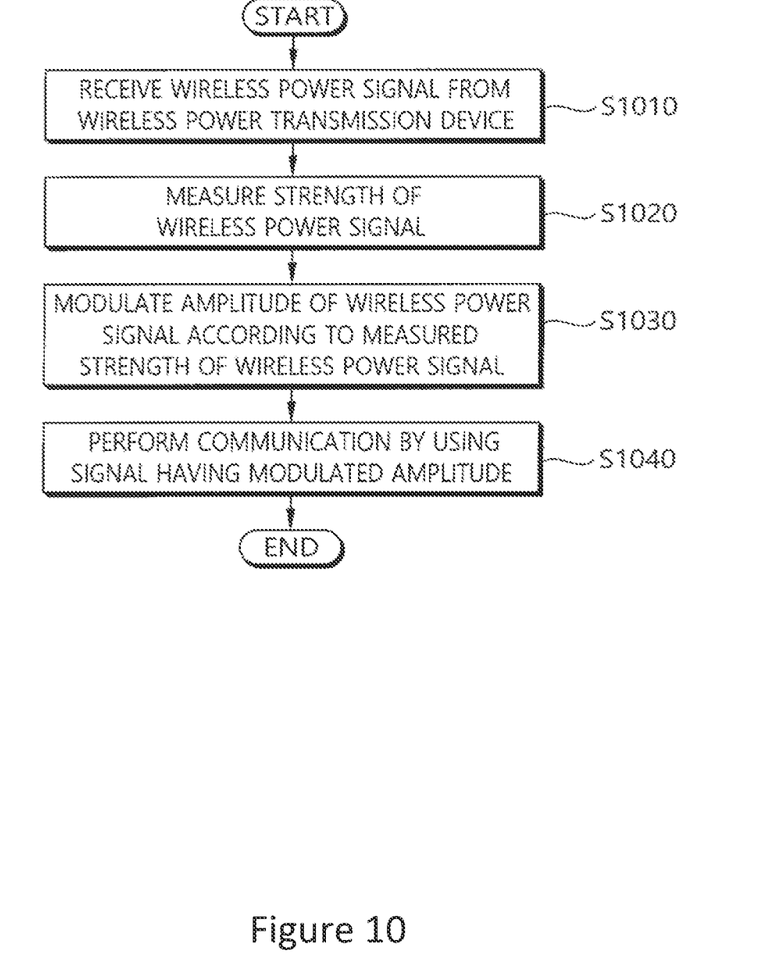
FIG. 10 is a flowchart illustrating a wireless communication method of a wireless power reception device according to an embodiment of the present disclosure.

FIG. 10 is a flowchart illustrating a wireless communication method of a wireless power reception device according to an embodiment of the present disclosure.

Referring to FIG. 10, the wireless power reception device receives the wireless power signal from the wireless power transmission device (S1010). In the case of receiving the wireless power signal, the wireless power transmitted from the primary coil of the wireless power transmission device may be received by the secondary coil of the wireless power reception device.

Next, the wireless power reception device measures the strength of the received wireless power signal (S1020). The measured power may be alternating current (AC) or AC voltage. As one example, the wireless power signal may be measured by a current sensor or a voltage sensor.

Next, the wireless power reception device modulates the amplitude of the wireless power signal according to the measured strength of the wireless power signal (S1030). The wireless power signal may be modulated by the modulator.

As one example, in the wireless power reception device, the modulator is configured to be positioned between the rectifier using a plurality of diodes or FETs and the regulator to modulate the DC power which is the output of the rectifier. In this case, the modulator may include one resistor and one or more transistors. Since the modulator includes the resistor, the response time may be minimized according to the used resistor. Since the modulator is connected to a DC terminal of a diode bridge in series, the modulator varies a current amount in a direction in which a signal flows without an influence by the frequency to enable smooth communication even with high power. Further, the modulator may include the PNP transistor and the controller is connected to the base terminal of the PNP transistor to control the current flow of the modulator.

As another example, the wireless power reception device is configured to be positioned between the secondary core and the rectifier using the plurality of diodes to modulate the AC power which is the output of the secondary core. In this case, the modulator may include two or more resistors and two or more transistors. Since the modulator includes the resistor, the response time may be minimized according to the used resistor. However, since the impedance varies depending on the frequency, when the full band is used, the distortion depending on the frequency may be caused, but the response time and frequency modulation may be more actively controlled by using two or more resistors and two or more transistors.

Next, the wireless power reception device performs communication with the wireless power transmission device by using the signal with the modulated amplitude (S1040). In detail, the signal with the modulated amplitude may be induced to the primary core of the wireless power transmission device from the secondary core of the wireless power reception device and the wireless power transmission device may control transmission power by detecting the signal induced in the primary core.

According to the present disclosure, since the wireless power reception device modulates the amplitude of the wireless power signal according to the strength of the wireless power signal transmitted from the wireless power transmission device to prevent a modulated signal from being distorted, smooth wireless communication is available even when strong wireless power signals are transmitted.

The above description just illustrates the technical spirit of the present disclosure and various changes and modifications can be made by those skilled in the art to which the present disclosure pertains without departing from an essential characteristic of the present disclosure. Therefore, the exemplary embodiments disclosed in the present disclosure are used to not limit but describe the technical spirit of the present disclosure and the scope of the technical spirit of the present disclosure is not limited by the exemplary embodiments. The scope of the present disclosure should be interpreted by the appended claims and it should be analyzed that all technical spirit in the equivalent range thereto is intended to be embraced by the scope of the present disclosure.

The invention claimed is:

1. A wireless power reception device comprising:
at least one secondary coil to receive a wireless power signal transmitted from a wireless power transmission device;
a rectifier configured to rectify the wireless power signal to a direct current (DC) power;
a series capacitor coupled to a first terminal of the at least one secondary coil;
a modulator coupled to the secondary coil and the rectifier to modulate an amplitude of the wireless power signal, wherein the modulator includes
a first capacitor and a first switch connected in series, the first capacitor connected to the series capacitor, and
a second capacitor and a second switch connected in series, the second capacitor connected to a second terminal of the at least one secondary coil; and
a controller configured to communicate with the wireless power transmission device using the modulator.

2. The wireless power reception device of claim 1, wherein at least one of the first switch and the second switch is a transistor.

3. The wireless power reception device of claim 2, wherein the transistor is any one of a metal oxide silicon field effect transistor (MOSFET) and a bipolar junction transistor (BJT).

4. The wireless power reception device of claim 1, further comprising a detection circuit configured to measure a strength of the wireless power signal by monitoring an output of the rectifier, wherein the controller communicates the strength of the wireless power signal using the modulator.

5. The wireless power reception device of claim 1, wherein the modulator is coupled to a direct current (DC) terminal of the wireless power reception device.

6. The wireless power reception device of claim 1, wherein the modulator is coupled to an alternating current (AC) terminal of the wireless power reception device.

7. The wireless power reception device of claim 1, wherein the modulator includes two or more transistors and two or more resistors.

8. A method by a wireless power reception device, the method comprising:
receiving a wireless power signal from a wireless power transmission device via a secondary coil of the wireless power reception device; and
communicating with the wireless power transmission device using a modulator, the wireless power reception device having a series capacitor coupled to a first terminal of the secondary coil, wherein the modulator is coupled with a controller, and wherein the modulator modulates an amplitude of the wireless power signal, the modulator including
a first capacitor and a first switch connected in series, the first capacitor connected to the series capacitor, and
a second capacitor and a second switch connected in series, the second capacitor connected to a second terminal of the secondary coil.

9. The method of claim 8, wherein at least one of the first switch and the second switch is a transistor.

10. The method of claim 9, wherein the transistor is any one of a metal oxide silicon field effect transistor (MOSFET) and a bipolar junction transistor (BJT).

11. The method of claim 8, further comprising measuring a strength of the wireless power signal by monitoring an output of a rectifier configured to rectify the wireless power signal to a direct current (DC) power, wherein communicating with the wireless power transmission device using the modulator comprises communicating the strength of the wireless power signal using the modulator.

12. The method of claim 8, wherein the modulator is coupled to a direct current (DC) terminal of the wireless power reception device.

13. The method of claim 8, wherein the modulator is coupled to an alternating current (AC) terminal of the wireless power reception device.

14. The method of claim 8, wherein the modulator includes two or more transistors and two or more resistors.

15. A wireless power reception device comprising:

means for receiving a wireless power signal from a wireless power transmission device via a secondary coil of the wireless power reception device;

means for rectifying the wireless power signal to a direct current (DC) power;

a series capacitor connected to a first terminal of the secondary coil; and means for communicating with the wireless power transmission device using a modulator, wherein the modulator is coupled with a controller, and wherein the modulator modulates an amplitude of the wireless power signal, the modulator including a first capacitor and a first switch connected in series, the first capacitor connected to the series capacitor, and a second capacitor and a second switch connected in series, the second capacitor connected to a second terminal of the secondary coil.

16. The wireless power reception device of claim 15, wherein at least one of the first switch and the second switch is a transistor.

17. The wireless power reception device of claim 16, wherein the transistor is any one of a metal oxide silicon field effect transistor (MOSFET) and a bipolar junction transistor (BJT).

18. The wireless power reception device of claim 15, further comprising means for measuring a strength of the wireless power signal by monitoring an output of the means for rectifying the wireless power signal, wherein the means for communicating with the wireless power transmission device communicates the strength of the wireless power signal using the modulator.

* * * * *